United States Patent
Yamaguchi et al.

(10) Patent No.: US 7,360,525 B2
(45) Date of Patent: Apr. 22, 2008

(54) CONTROL SYSTEM FOR INTERNAL COMBUSTION ENGINE

(75) Inventors: Satoshi Yamaguchi, Wako (JP); Mamoru Hasegawa, Wako (JP); Hideki Sakamoto, Wako (JP); Naoto Kitayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/510,558

(22) Filed: Aug. 28, 2006

(65) Prior Publication Data
US 2007/0055437 A1 Mar. 8, 2007

(30) Foreign Application Priority Data
Sep. 2, 2005 (JP) .............................. 2005-254238

(51) Int. Cl.
*F02M 51/00* (2006.01)
*F02P 5/00* (2006.01)

(52) U.S. Cl. .................... 123/478; 123/406.11
(58) Field of Classification Search ................ 123/445, 123/478, 480, 406.11, 406.12, 406.47, 406.48
See application file for complete search history.

(56) References Cited

U.S. PATENT DOCUMENTS

| | | | |
|---|---|---|---|
| 4,428,051 A * | 1/1984 | Kuboki et al. ............... 701/115 |
| 5,758,309 A * | 5/1998 | Satoh ............................ 701/108 |
| 5,946,906 A * | 9/1999 | Akazaki et al. ................ 60/278 |
| 6,463,907 B1 | 10/2002 | Hiltner |
| 6,612,292 B2 * | 9/2003 | Shirakawa ..................... 123/501 |
| 7,066,160 B2 * | 6/2006 | Matsumoto ............. 123/568.16 |

FOREIGN PATENT DOCUMENTS

| | | |
|---|---|---|
| EP | 0 905 361 A2 | 3/1999 |
| JP | 04-164140 A | 6/1992 |
| JP | 11-107820 A | 4/1999 |
| JP | 2004-100566 A | 4/2004 |
| JP | 2004-353527 A | 12/2004 |

* cited by examiner

*Primary Examiner*—John T. Kown
(74) *Attorney, Agent, or Firm*—Arent Fox LLP

(57) ABSTRACT

A control system for an internal combustion engine wherein fuel injection timing is determined according to a detected engine operating condition. An actual ignition timing of the fuel is detected and an ignition delay correction amount is calculated wherein the actual ignition timing coincides with a target ignition timing set according to the engine operating condition. A cetane number of the fuel is estimated using a plurality of conversion tables for converting the ignition delay correction amount to the cetane number of the fuel. The fuel injection timing is corrected with the ignition delay correction amount. An exhaust gas recirculation control value map used for calculating a control value of the recirculation amount of exhaust gases is switched according to the estimated cetane number. The conversion table used for estimating the cetane number is switched according to the estimated cetane number.

6 Claims, 7 Drawing Sheets

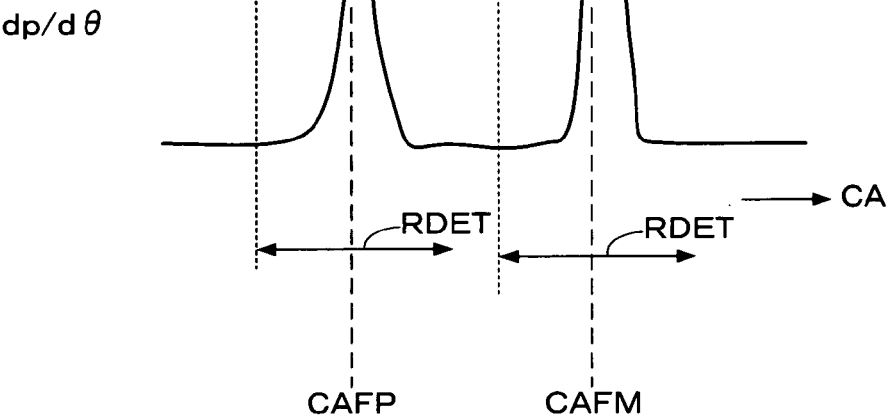
FIG. 9A INJP — CAIP
FIG. 9B INJM — CAIM
FIG. 9C dp/dθ — DPP, DPM, RDET, CAFP, CAFM, CA
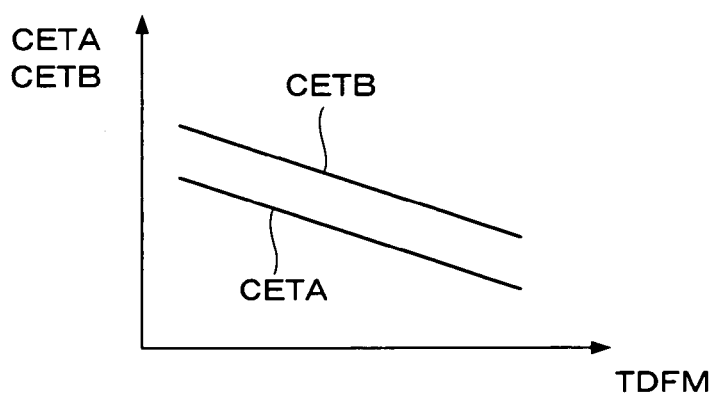
FIG. 10

CONTROL SYSTEM FOR INTERNAL COMBUSTION ENGINE

BACKGROUND OF THE INVENTION

1. Field of the Invention

The present invention relates to a control system for an internal combustion engine, and particularly, to a system for controlling an internal combustion engine according to a pressure in the cylinder detected by a cylinder pressure sensor.

2. Description of the Related Art

Japanese Patent Laid-open No. 2004-100566 (JP '566) discloses a fuel injection control apparatus in which the cylinder pressure (pressure in the combustion chamber) is detected by a cylinder pressure sensor. A fuel injection amount, a fuel injection timing, and the like, are controlled according to the detected cylinder pressure. According to the disclosed apparatus, the crank angle Cmax at which the cylinder pressure reaches the maximum value is detected, and the fuel injection timing is corrected so that the detected crank angle Cmax coincides with a target value which is previously set according to the engine operating condition.

If the internal combustion engine is a diesel engine, an actual ignition timing changes depending on the cetane number of the fuel being used, even if the fuel injection timing is the same. Therefore, the control used by the above-described conventional apparatus is effective when the combustion characteristic of the fuel changes.

In an engine having an exhaust gas recirculation mechanism, the combustion state of fuel in the combustion chamber changes due to execution of the exhaust gas recirculation. Therefore, it is desirable to control the amount of exhaust gases being recirculated according to the actual combustion state. However, such a situation is not taken into consideration by the above-described control apparatus.

SUMMARY OF THE INVENTION

The present invention was attained contemplating the above-described points, and an aspect of the invention is to provide a control system for an internal combustion engine which detects an actual ignition timing of fuel based on the cylinder pressure detected by the cylinder pressure sensor and which appropriately controls the recirculation amount of exhaust gases according to the detected actual ignition timing, wherein the cetane number of the fuel in use can be accurately estimated.

To attain the above-described aspect, the present invention provides a control system for an internal combustion engine having a fuel injection means provided in a combustion chamber of the engine for injecting fuel into the combustion chamber and an exhaust gas recirculation mechanism for recirculating exhaust gases of the engine to an intake system of the engine. The control system includes operating condition detecting means, fuel injection control means, target ignition timing storing means, ignition timing detecting means, target ignition timing calculating means, feedback control means, a plurality of exhaust gas recirculation control value storing means, exhaust gas recirculation control means, a plurality of conversion table storing means, and cetane number estimating means. The operating condition detecting means detects an operating condition of the engine. The fuel injection control means determines a fuel injection timing (CAIMM) according to the detected engine operating condition and executes fuel injection through the fuel injection means. The target ignition timing storing means stores target ignition timings (CAFMM) of the fuel injected into the combustion chamber. The target ignition timings (CAFMM) are set according to the operating condition of the engine. The ignition timing detecting means detects an actual ignition timing (CAFM) of the fuel injected into the combustion chamber. The target ignition timing calculating means calculates the target ignition timing (CAFMM) using the target ignition timing storing means. The feedback control means calculates an ignition delay correction amount (CADM) so that the actual ignition timing (CAFM) coincides with the target ignition timing (CAFMM). A plurality of the exhaust gas recirculation control value storing means store control values (GEGRM1, GEGRM2) of an amount of exhaust gases recirculated through the exhaust gas recirculation mechanism. The control values (GEGRM1, GEGRM2) are set according to the operating condition of the engine. The exhaust gas recirculation control means calculates the control value (GEGR) of the amount of exhaust gases recirculated using the plurality of exhaust gas recirculation control value storing means to control the amount of exhaust gases being recirculated. A plurality of the conversion table storing means store a conversion table that is used for converting the ignition delay correction amount (CADM) to the cetane numbers (CETA, CETB) of the fuel. The cetane number estimating means estimates the cetane number (CETLRN) of the fuel using the plurality of conversion table storing means. The fuel injection control means corrects the fuel injection timing (CAIMM) with the ignition delay correction amount (CADM). The exhaust gas recirculation control means switches the exhaust gas recirculation control value storing means used for calculating the control value (GEGR) of the amount of exhaust gases being recirculated according to the estimated cetane number (CETLRN). The cetane number estimating means switches the conversion table storing means used for estimating the cetane number according to the estimated cetane number (CETLRN). In the present invention, the "ignition timing" means the compression ignition timing that is a timing of ignition caused not by the spark plug but by the compression of the air-fuel mixture.

With the above-described configuration, the target ignition timing is calculated according to the engine operating condition, the ignition delay correction amount is calculated so that the detected actual ignition timing coincides with the target ignition timing, and the fuel injection timing is corrected by the ignition delay correction amount. Further, the control value of the amount of exhaust gases being recirculated is calculated using the exhaust gas recirculation control value storing means that stores control values of the amount of exhaust gases recirculated, wherein the stored control values are set according to the engine operating condition, and the amount of exhaust gases being recirculated is controlled using the calculated control value. The cetane number of the fuel is estimated using the conversion table storing means which stores the conversion table to be used for converting the ignition delay correction amount to the cetane number of the fuel. The exhaust gas recirculation control value storing means used for calculating the control value of the amount of exhaust gases being recirculated is switched according to the estimated cetane number. The conversion table storing means used for estimating the cetane number is switched according to the estimated cetane number.

When the exhaust gas recirculation control value storing means storing the control values of the amount of exhaust gases being recirculated is switched according to the estimated cetane number, the amount of exhaust gases recirculated changes and the ignition delay correction amount also changes. Therefore, the cetane number is accurately estimated by switching the conversion table storing means according to the estimated cetane number. Consequently, the cetane number of the fuel in use is accurately estimated while appropriately controlling the amount of exhaust gases recirculated according to the detected actual ignition timing.

Preferably, the plurality of the conversion tables stored in the plurality of conversion table storing means are set based on fuels of different cetane numbers.

Preferably, the cetane number estimating means performs the estimation process when the operating condition of the engine is in a premix combustion region.

BRIEF DESCRIPTION OF THE DRAWINGS

FIGS. 9A-9C are time charts illustrating a method of detecting an ignition timing.

FIG. 10 illustrates a table used for calculating a cetane number (CETA, CETB) from an ignition delay time period (TDFM)

DETAILED DESCRIPTION OF THE PREFERRED EMBODIMENTS

Preferred embodiments of the present invention will now be described with reference to the drawings.

Figure 1:
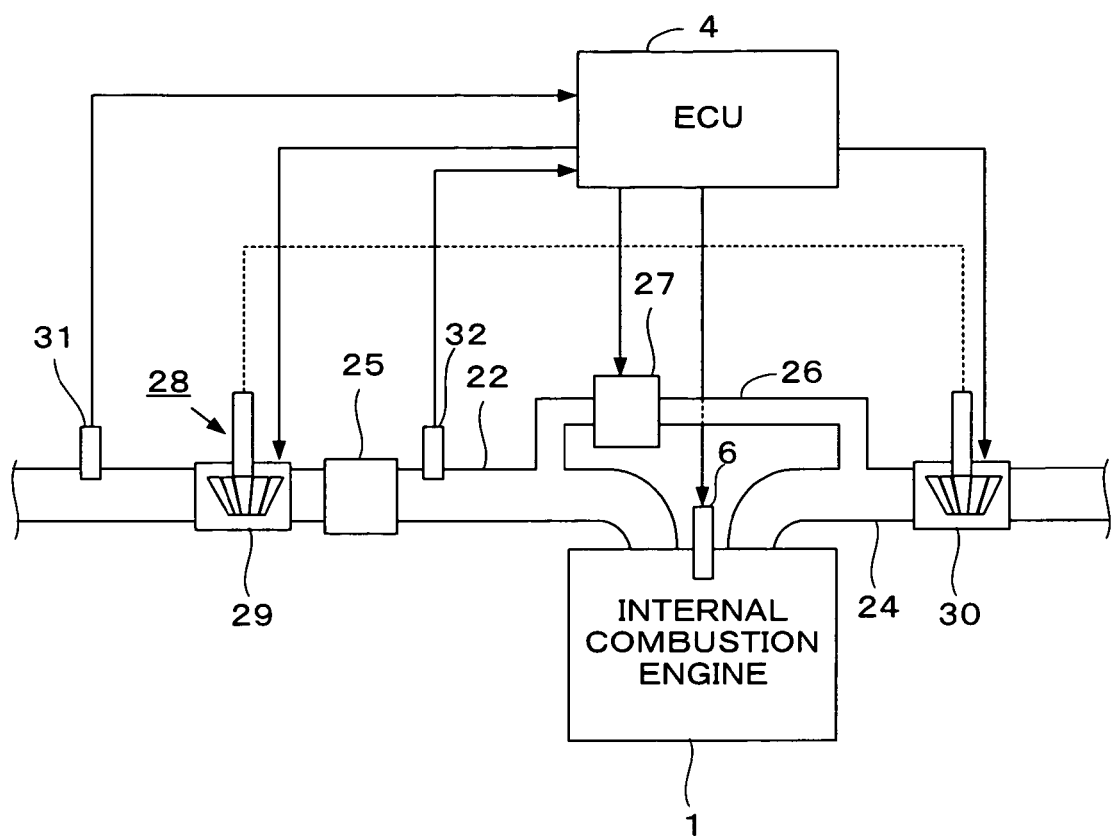
FIG. 1 is a schematic diagram illustrating an internal combustion engine and a control system therefor according to one embodiment of the present invention.
Figure 2:
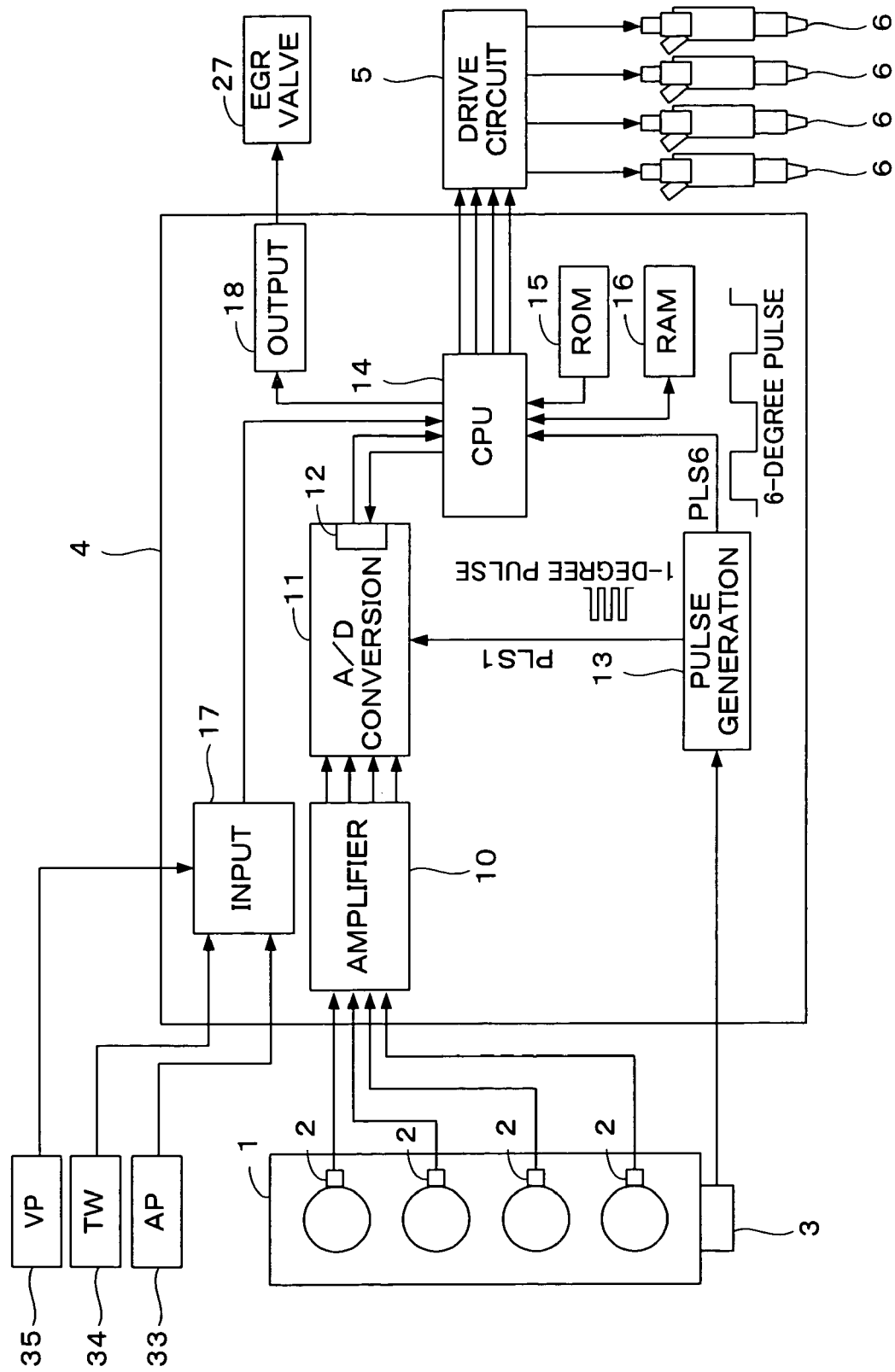
FIG. 2 is a schematic diagram illustrating a configuration of a part of the control system illustrated in FIG. 1.

FIGS. 1 and 2 are schematic diagrams illustrating a configuration of an internal combustion engine 1 and a control system therefor according to one embodiment of the present invention. The internal combustion engine 1 (hereinafter referred to as "engine"), which has four cylinders, is a diesel engine, wherein fuel is injected directly into the cylinders. Each cylinder is provided with a fuel injection valve 6 electrically connected to an electronic control unit 4 (hereinafter referred to as "ECU 4"). The ECU 4 controls a valve opening period and a valve opening timing of each fuel injection valve 6. That is, the fuel injection period and fuel injection timing are controlled by the ECU 4.

The engine 1 has an intake pipe 22, an exhaust pipe 24, and a turbocharger 28. The turbocharger 28 includes a turbine 30 and a compressor 29. The turbine 30 is driven by the kinetic energy of exhaust gases. The compressor 29, which is rotationally driven by the turbine 30, compresses the intake air of the engine 1.

The turbine 30 has a plurality of movable vanes (not shown) and is configured so that the rotational speed of the turbine 30 is adjusted by changing an opening of the movable vanes (hereinafter referred to as "vane opening"). The vane opening of the turbine 30 is electromagnetically controlled by the ECU 4.

The intake pipe 22 is provided with an intercooler 25 on a downstream side of the compressor 29 and the intercooler 25 cools pressurized air.

An exhaust gas recirculation passage 26 for recirculating exhaust gases to the intake pipe 22 is provided between the upstream side of the turbine 30 in the exhaust pipe 24 and the intake pipe 22. The exhaust gas recirculation passage 26 is provided with an exhaust gas recirculation control valve 27 (hereinafter referred to as "EGR valve") that controls the amount of exhaust gases that are recirculated. The EGR valve 27 is an electromagnetic valve having a solenoid. A valve opening of the EGR valve 27 is controlled by the ECU 4.

The intake pipe 22 is provided with an intake air flow rate sensor 31 and a boost pressure sensor 32. The intake air flow rate sensor 31 detects an intake air flow rate GA. The boost pressure sensor 32 detects an intake pressure (boost pressure) PB on the downstream side of the turbocharger 28. The detection signals of the intake air flow rate sensor 31 and the boost pressure sensor 32 are supplied to the ECU 4.

Each cylinder of the engine 1 is provided with a cylinder pressure sensor 2 for detecting a cylinder pressure (a pressure in the combustion chamber of the engine 1). In this embodiment, the cylinder pressure sensor 2 is configured in one body together with a grow plug disposed in each cylinder. The detection signal of the cylinder pressure sensor 2 is supplied to the ECU 4. It is to be noted that the detection signal of the cylinder pressure sensor 2 corresponds to a differential signal of the cylinder pressure PCYL with respect to the crank angle (time). The cylinder pressure PCYL is obtained by integrating the output of the cylinder pressure sensor 2.

The engine 1 is provided with a crank angle position sensor 3 for detecting a rotation angle of the crankshaft (not shown) of the engine 1. The crank angle position sensor 3 generates one pulse at every 1 degree of the crank angle, and the pulse is supplied to the ECU 4. The crank angle position sensor 3 further generates a cylinder discrimination pulse at a predetermined crank angle for a specific cylinder of the engine 1 and then supplies the cylinder discrimination pulse to the ECU 4.

An accelerator sensor 33 for detecting an operation amount AP of the accelerator pedal of the vehicle driven by the engine 1, a coolant temperature sensor 34 for detecting a coolant temperature TW of the engine 1, a vehicle speed sensor 35 for detecting a vehicle speed VP of the vehicle, an oxygen concentration sensor (not shown) for detecting an oxygen concentration in the exhaust gases, and an intake air temperature sensor (not shown) for detecting an intake air temperature TA of the engine 1 are connected to the ECU 4. The detection signals of these sensors are supplied to the ECU 4.

A control signal of the fuel injection valve 6 located in the combustion chamber of each cylinder of the engine 1 is provided by the ECU 4 to a drive circuit 5. The drive circuit 5 is connected to the fuel injection valves 6 and supplies drive signals according to the control signal from the ECU 4 to the fuel injection valves 6. Fuel is injected into the combustion chamber of each cylinder on a fuel injection timing in accordance with a control signal that is output by the ECU 4. The amount of fuel that is injected is controlled to a value in accordance with the control signal from the ECU 4.

The ECU 4 includes an amplifier 10, an A/D conversion block 11, a pulse generation block 13, a CPU 14 (Central Processing Unit), a ROM 15 (Read Only Memory) for storing programs executed by the CPU 14, a RAM 16 (Random Access Memory) for storing calculation results, and the like, an input circuit 17, and an output circuit 18. The detection signal of the cylinder pressure sensor 2 is input to the amplifier 10. The amplifier 10 amplifies the input signal. The signal amplified by the amplifier 10 is then input to the A/D conversion block 11. The pulse signal output from the crank angle position sensor 3 is input to the pulse generation block 13.

The A/D conversion block 11, which includes a buffer 12, converts the cylinder pressure sensor output from the amplifier 10 to a digital value (hereinafter referred to as "pressure change rate") dp/dθ, and stores the converted digital value in the buffer 12. Specifically, a pulse signal PLS1 (hereinafter referred to as "one-degree pulse"), having a crank angle period of one degree, is supplied to the A/D conversion block 11 from the pulse generation block 13. The cylinder pressure sensor output is sampled at the intervals of the one-degree pulse PLS1 and converted to a digital value. The digital value is then stored in the buffer 12.

A pulse signal PLS6 having a crank angle period of six degrees is supplied to the CPU 14 from the pulse generation block 13. The CPU 14 performs a process for reading the digital value stored in the buffer 12 at intervals of the six-degree pulse PLS6. That is, in the present embodiment, the A/D conversion block 11 does not request an interrupt to the CPU 14, but the CPU 14 does perform the reading process at intervals of the six-degree pulse PLS6.

The input circuit 17 converts the detection signals from various sensors to digital values and supplies the digital values to the CPU 14. An engine rotational speed NE is calculated from the time period of the six-degree pulse PLS6. A demand torque TRQ of the engine 1 is calculated according to the operation amount AP of the accelerator pedal.

The CPU 14 calculates a target exhaust gas recirculation amount GEGR (hereinafter referred to as "target EGR amount) according to the engine operating condition and supplies a duty control signal to the EGR valve 20 through the output circuit 18 for controlling an opening of the EGR valve 20 according to the target EGR amount.

Figure 3:
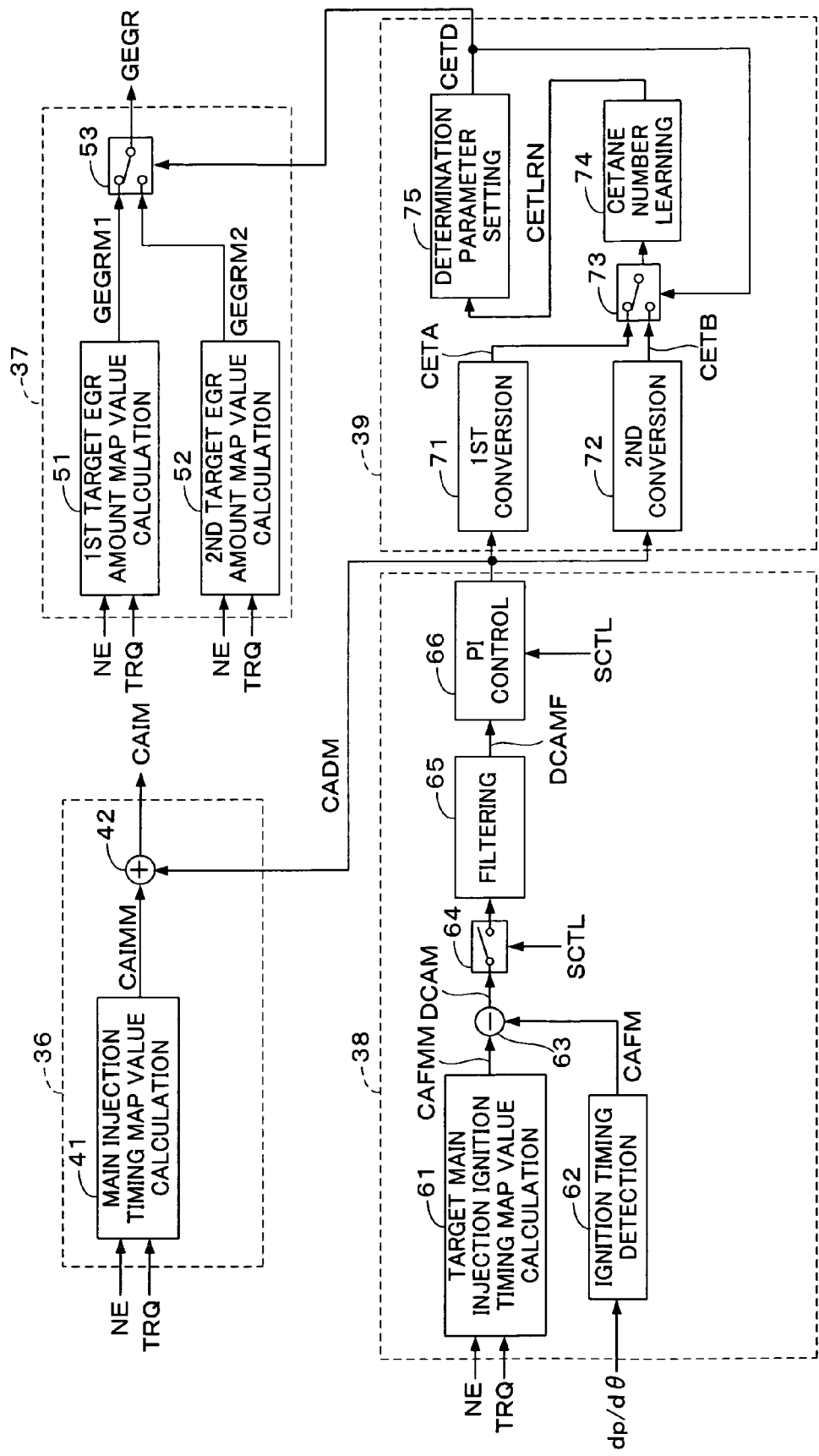
FIG. 3 is a block diagram illustrating a configuration of a module for calculating a main injection timing (CAIM) and a target exhaust gas recirculation amount (GEGR)

FIG. 3 is a block diagram illustrating a configuration of a module which calculates a main injection timing CAIM of the fuel injection valve 6 and the target EGR amount GEGR. The function of the module is realized by the processes executed by the CPU 14.

The module of FIG. 3 includes a main injection timing calculation block 36 for calculating the main injection timing CAIM, a target EGR amount GEGR calculation block 37 for calculating the target EGR amount GEGR, an ignition delay correction amount calculation block 38 for detecting an actual ignition timing of the fuel injected into the combustion chamber and for calculating an ignition delay correction amount CADM of the fuel injection timing according to the actual ignition timing, and a cetane number estimation block 39 for estimating a cetane number of the fuel being used according to the ignition delay correction amount CADM to calculate a determined cetane number parameter CETD. The determined cetane number parameter CETD is set based on a relationship between the estimated cetane number and a predetermined threshold value and indicates the cetane number of the fuel in use.

In this embodiment, when the cetane number of the fuel in use is determined to be a first cetane number CET1 (for example, 40) which is relatively low, the determined cetane number parameter CETD is set to "1". When the cetane number of the fuel in use is determined to be a second cetane number CET2 (for example, 57) which is relatively high, the determined cetane number parameter CETD is set to "2".

The main injection timing calculation block 36 includes a main injection timing map value calculation block 41 and an adding block 42. The main injection timing map value calculation block 41 retrieves a CAIMM map which is previously set according to the engine rotational speed NE and the demand torque TRQ to calculate a main injection timing map value CAIMM. The CAIMM map is set based on the fuel of the second cetane number CET2.

The adding block 42 adds an ignition delay correction amount CADM to the main injection timing map value CAIMM, that is, advances the main injection timing by the ignition delay correction amount CADM to calculate the main injection timing CAIM.

The target EGR amount calculation block 37 includes a first target EGR amount map value calculation block 51, a second target EGR amount map value calculation block 52, and a switching block 53. The first target EGR amount map value calculation block 51 retrieves a GEGRM1 map which is previously set according to the engine rotational speed NE and the demand torque TRQ to calculate a first target EGR amount map value GEGRM1. The GEGRM1 map is set based on the fuel of the first cetane number CET1.

The second target EGR amount map value calculation block 52 retrieves a GEGRM2 map which is previously set according to the engine rotational speed NE and the demand torque TRQ to calculate a second target EGR amount map value GEGRM2. The GEGRM2 map is set based on the fuel of the second cetane number CET2.

The switching block 53 selects the first target EGR amount map value GEGRM1 when the determined cetane number parameter CETD is equal to "1" which indicates that the fuel of the first cetane number CET1 is being used. The switching block 53 selects the second target EGR amount map value GEGRM2 when the determined cetane number parameter CETD is equal to "2" which indicates that the fuel of the second cetane number CET2 is being used. The selected EGR amount is output as the target EGR amount GEGR. Thereby, the recirculation amount of exhaust gases can be controlled to a value suitable for the cetane number of the fuel in use.

The ignition delay correction amount calculation block 38 includes a target main injection ignition timing map value calculation block 61, an ignition timing detection block 62, a subtracting block 63, a switching block 64, a filtering block 65, and a PI control block 66.

The target main injection ignition timing map value calculation block 61 retrieves a CAFMM map which is previously set according to the engine rotational speed NE and the demand torque TRQ to calculate a target main injection ignition timing map value CAFMM. The CAFMM map is set based on the fuel of the second cetane number CET2. The ignition timing detection block 62 detects a main injection ignition timing CAFM according to the pressure change rate dp/dθ obtained by converting the output signal of the cylinder pressure sensor 2 to a digital value. The detection method thereof will be described later with reference to FIGS. 7-9.

The subtracting block 63 subtracts the detected main injection ignition timing CAFM from the target main injection ignition timing map value CAFMM to calculate an ignition delay angle DCAM. The switching block 64 is on/off controlled by a switching control signal SCTL. Specifically, the switching block 64 is turned off when the switching control signal SCTL is equal to "0" and turned on when the switching control signal SCTL is equal to "1".

Figure 4:
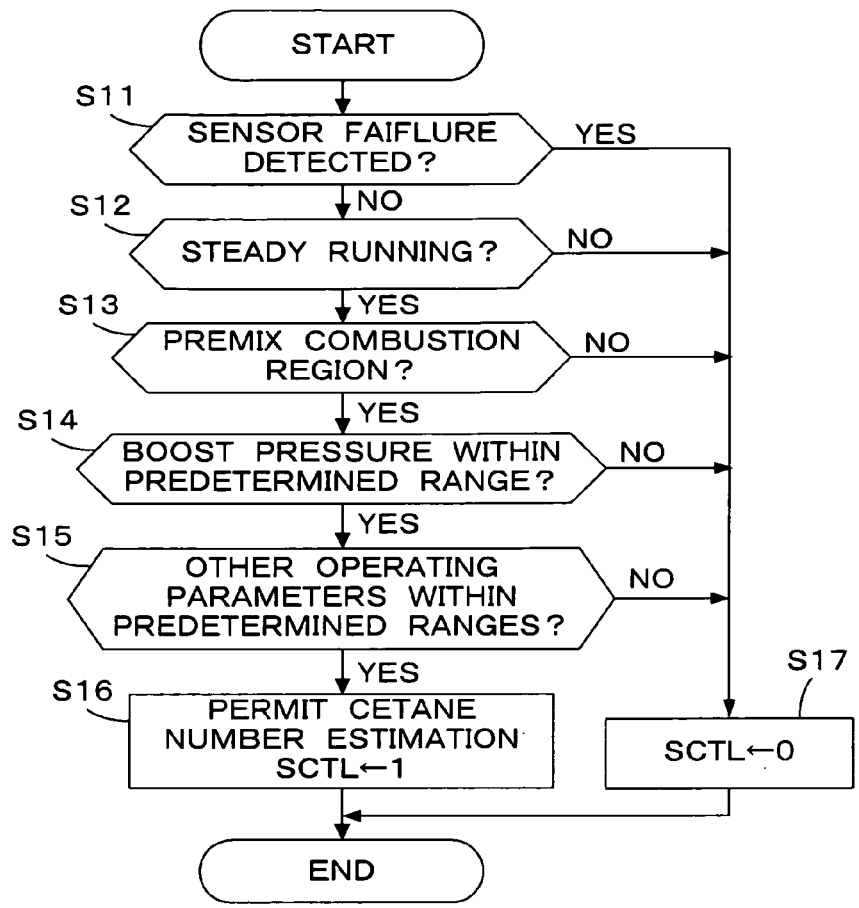
FIG. 4 is a flowchart illustrating a process for setting a switching control signal (SCTL) supplied to a switching block illustrated in FIG. 3.

In the process illustrated in FIG. 4, the switching control signal SCTL is set to "1" when a feedback control of the fuel injection timing, that is, a correction of the fuel injection timing with the ignition delay correction amount CADM calculated according to the actual ignition timing CAFM, and a cetane number estimation of the fuel in use are executed. Otherwise, the switching control signal SCTL is set to "0". Consequently, the switching block 64 is turned on when performing the feedback control of the fuel injection timing and the cetane number estimation.

In step S11 of FIG. 4, it is determined whether any one of the sensors, that is, the crank angle position sensor 3, the accelerator sensor 21 and/or the cylinder pressure sensor 2, necessary for the cetane number estimation process, has failed. If the answer to step S11 is affirmative (YES), the switching control signal SCTL is set to "0" (step S17). If no failure of the sensors is detected, it is determined whether the vehicle driven by the engine 1 is running in the steady running state (step S12). If the vehicle is running in the steady running state, it is determined whether the operating condition of the engine 1 is in the premix combustion region (step S13).

Figure 5:
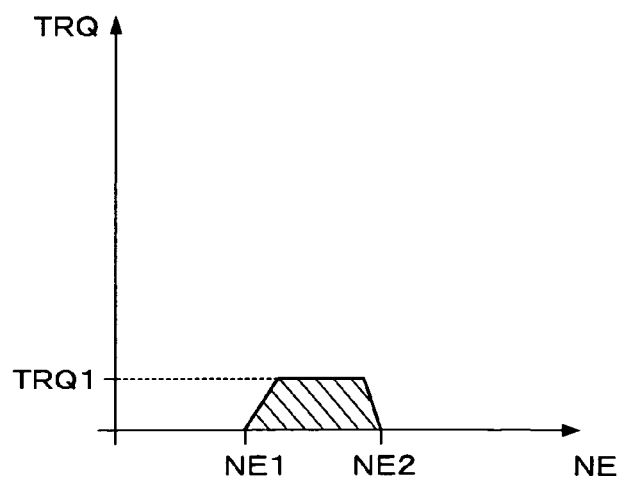
FIG. 5 is a diagram illustrating a premix combustion region.

The premix combustion is defined as a combustion in which the injected fuel burns after a delay time period has elapsed from the time of fuel injection. For example, the hatching region illustrated in FIG. 5, i.e., the region defined by the demand torque TRQ below the predetermined torque TRQ1, e.g., 60 Nm, and the engine rotational speed NE in the range from a first predetermined rotational speed NE1, e.g., 1200 rpm to a second predetermined rotational speed NE2, e.g., 2300 rpm, is the premix combustion region. In the premix combustion region, the change in the ignition timing caused by a change in the cetane number of the fuel becomes relatively large. Therefore, the feedback control of the fuel injection timing based on the ignition delay and the estimation of the cetane number is accurately performed.

If the answer to step S13 is affirmative (YES), it is determined whether the boost pressure PB is within a predetermined range, e.g., within the range of ±5 percent of the target pressure value (step S14). If the answer to step S14 is affirmative (YES), it is determined whether other engine operating parameters are within predetermined ranges which are determined corresponding to each engine operating parameter. For example, it is determined whether the detected fresh air flow rate GA is within the range of ±5 percent of its target value, whether the air-fuel ratio AF detected by the oxygen concentration sensor is within the range of ±5 percent of its target value, whether an opening of a swirl valve (not shown) is within the range of ±5 percent of its target value, and whether the fuel pressure PF is within the range of ±5 percent of its target value. If all of the operating parameters are in the predetermined ranges, the execution condition of the cetane number estimation is determined to be satisfied, and the switching control signal SCTL is set to "1" (step S16). When the switching control signal SCTL is set to "1", the switching block 64 is turned on as described above, and the feedback control of the fuel injection timing, that is, the update of the ignition delay correction amount CADM, and the estimation process of the cetane number are performed.

If any one of the answers to steps S12-S15 is negative (NO), the process proceeds to step S17, wherein the switching control signal SCTL is set to "0".

According to the process of FIG. 4, when the operating condition of the engine 1 is in the premix combustion region and the boost pressure PB is within predetermined ranges, if the other conditions (steps S11, S12, and S15) are satisfied, execution of the feedback control of the fuel injection timing, that is, the update of the ignition delay correction amount CADM, and estimation of the cetane number are permitted. By permitting feedback control of the fuel injection timing and estimation of the cetane number on condition that the operating condition of the engine is in the premix combustion region, the change in the ignition timing caused by a change in the cetane number of the fuel becomes relatively large. Therefore, correction of the fuel injection timing based on the ignition delay and estimation of the cetane number are accurately performed. Further, the ignition timing of the fuel is easily influenced by a change in the boost pressure. Therefore, by stopping estimation of the cetane number when the boost pressure PB is outside the predetermined range, the inappropriate correction of fuel injection timing caused by a change in characteristics or failure of the turbocharger 28 and the erroneous determination of the cetane number of the fuel are prevented.

Returning to FIG. 3, the filtering block 65 performs a filtering operation by using a least-squares method calculation or a moving averaging calculation of data of the ignition delay angle DCAM obtained in a comparatively long time period, e.g., 10-60 seconds, to calculate a filtered ignition delay angle DCAMF. The PI control block 66 calculates the ignition delay correction amount CADM of the fuel injection timing with the proportional/integral control method so that the ignition delay angle DCAMF may become "0". Specifically, the ignition delay correction amount CADM is set to a greater value as the ignition delay angle DCAMF increases. Therefore, the ignition delay correction amount CADM substantially changes in proportion to the ignition delay angle DCAMF, and the ignition delay correction amount CADM is used to estimate the cetane number of the fuel in use. When the switching control signal SCTL set in the process of FIG. 4 is equal to "0", the PI control block 66 stops updating the ignition delay correction amount CADM and outputs the most recently updated ignition delay correction amount CADM.

The cetane number estimation block 39 includes a first conversion block 71, a second conversion block 72, a switching block 73, a cetane number learning block 74, and a determination parameter setting block 75.

To calculate a first converted cetane number CETA, the first conversion block 71 converts the ignition delay correction amount CADM to an ignition delay time period TDFM according to the engine rotational speed NE and retrieves a CETA table illustrated in FIG. 10 according to the ignition delay time period TDFM. The CETA table is set based on the fuel of the first cetane number CET1. To calculate a second converted cetane number CETB, the second conversion block 72 converts the ignition delay correction amount CADM to the ignition delay time period TDFM according to the engine rotational speed NE and retrieves a CETB table illustrated in FIG. 10 according to the ignition delay time period TDFM. The CETB table is set based on the fuel of the second cetane number CET2. As illustrated in FIG. 10, if the ignition delay time period TDFM is the same, CETA is less than CETB.

The switching block 73 is switched according to the determined cetane number parameter CETD. That is, if the determined cetane number parameter CETD is equal to "1", the first converted cetane number CETA is selected. If the determined cetane number parameter CETD is equal to "2", the second converted cetane number CETB is selected. The selected parameter is output as the estimated cetane number CET.

The cetane number learning block 74 applies the estimated cetane number CET to the following equation (1) to calculate a cetane number learning value CETLRN:

$$CETLRN = \alpha \times CET + (1-\alpha) \times CETLRN \quad (1)$$

where $\alpha$ is an averaging coefficient set to a value between "0" and "1", and the CETLRN on the right side is a preceding calculated value.

The cetane number learning value CETLRN described above is calculated using the output from each cylinder pressure sensor of a corresponding cylinder of all, e.g., four, of the cylinders in the engine 1. Therefore, averaging of the cetane number CET detected for each cylinder and the cetane numbers CET whose detection timings are different from each other, is performed by the above-described equation (1). When the cetane number estimation process is not executed, the most recent cetane number learning value CETLRN of the stored learning values is output from the cetane number learning block 74.

The determination parameter setting block 75 determines whether the cetane number of fuel being used is the first cetane number CET1 or the second cetane number CET2 according to the cetane number learning value CETLRN. When the determined cetane number is the first cetane number CET1, the determined cetane number parameter CETD is set to "1". When the determined cetane number is the second cetane number CET2, the determined cetane number parameter CETD is set to "2".

Figure 6:
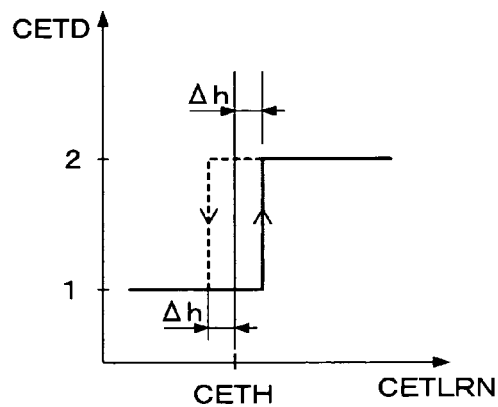
FIG. 6 is a diagram illustrating a setting method of a determined cetane number parameter.

Specifically, as illustrated in FIG. 6, the cetane number learning value CETLRN is compared with a hysteresis threshold value. That is, if a parameter (hereinafter referred to as "hysteresis parameter") for adding the hysteresis is indicated by "$\Delta h$", the determined cetane number parameter CETD is changed to "2" when the determined cetane number parameter CETD is equal to "1" and the cetane number learning value CETLRN exceeds the value obtained by adding the hysteresis parameter $\Delta h$ to the threshold value CETH. Further, the determined cetane number parameter CETD is changed to "1" when the determined cetane number parameter CETD is equal to "2" and the cetane number learning value CETLRN becomes lower than the value obtained by subtracting the hysteresis parameter $\Delta h$ from the threshold value CETH.

Figure 7:
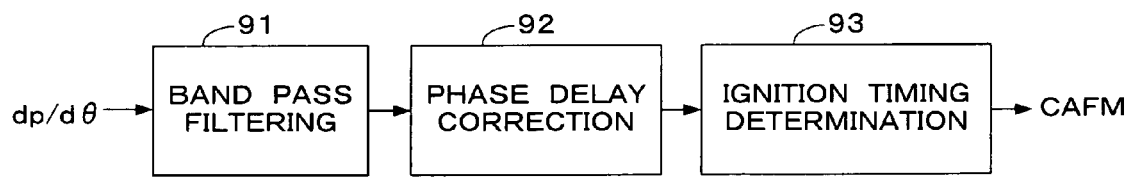
FIG. 7 is a block diagram illustrating a configuration of an ignition timing detection block illustrated in FIG. 3.
Figure 8:
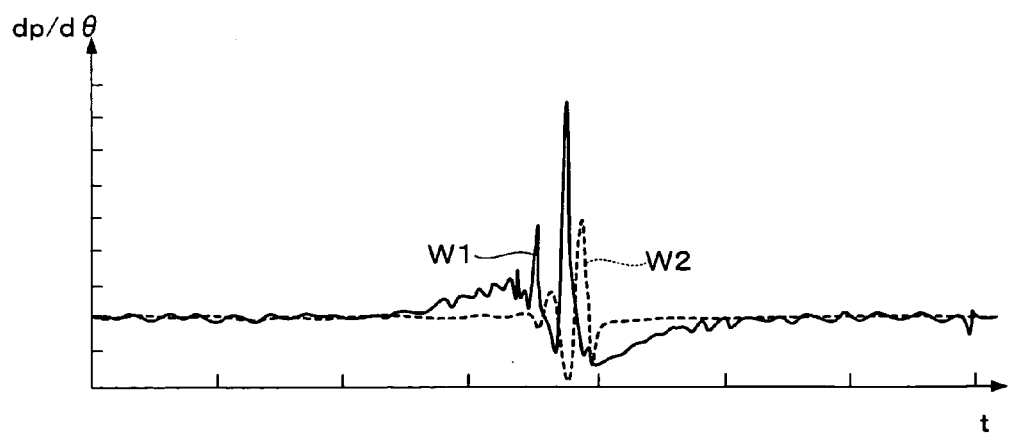
FIG. 8 is a time chart illustrating a band pass filtering of a cylinder pressure sensor output.

FIG. 7 is a block diagram illustrating a configuration of the ignition timing detection block 62 illustrated in FIG. 3. The ignition timing detection block 62 includes a band pass filtering block 91, a phase delay correction block 92, and an ignition timing determination block 93. The pressure change rate $dp/d\theta$ output from the cylinder pressure sensor 2 is input to the band pass filtering block 91. In FIG. 8, the waveform W1 shows an input waveform and the waveform W2 shows an output waveform. The phase delay, which occurs in the band pass filtering block 91, is corrected in the phase delay correction block 92.

The ignition timing determination block 93 determines a crank angle position CAFP (hereinafter referred to as "pilot injection ignition timing") at which the pressure change rate $dp/d\theta$ takes a peak value corresponding to the pilot injection, and a crank angle position CAFM (hereinafter referred to as "main injection ignition timing") at which the pressure change rate $dp/d\theta$ takes another peak value corresponding to the main injection. Specifically, as illustrated in FIG. 9C, the crank angle position at which the pressure change rate $dp/d\theta$ output from the phase delay correction block 92 exceeds a pilot detection threshold value DPP is determined to be the pilot injection ignition timing CAFP, and the crank angle position at which the pressure change rate $dp/d\theta$ exceeds a main detection threshold value DPM is determined to be the main injection ignition timing CAFM. In this embodiment, only the main injection ignition timing CAFM is used for estimating the cetane number CET.

FIGS. 9A and 9B illustrate a pilot injection pulse INJP started from a crank angle position CAIP and a main injection pulse INJM started from a crank angle position CAIM. FIG. 9C illustrates an angle position range RDET, e.g., 10 degrees, where the ignition timings CAFP and CAFM are detected. By limiting the detection angle position range RDET to a comparatively narrow range, as illustrated in FIG. 9C, the ignition timing is accurately determined without increasing a calculation load on the CPU 14.

Figure 11:
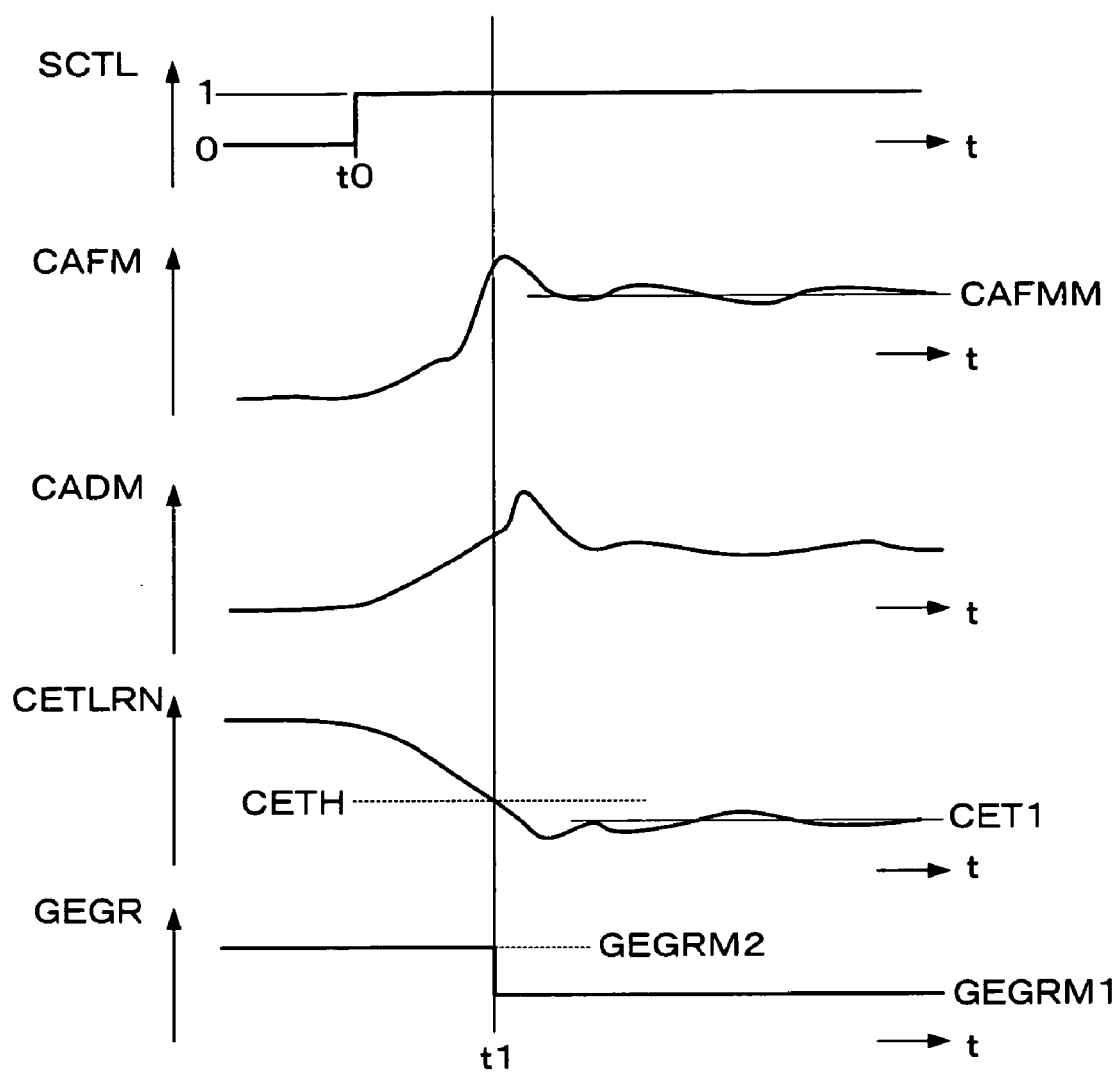
FIG. 11 is a time chart illustrating the control operation.

FIG. 11 is a time chart illustrating the operation when the fuel of a high cetane number is being used, wherein the determined cetane number parameter CETD is set to "2", and the fuel of a low cetane number, e.g., 40, is refueled. The execution condition of the feedback control (cetane number estimation) is satisfied at time t0, and the switching control signal SCTL changes from "0" to "1". At time t0, the main injection ignition timing CAFM is in the state where the main injection ignition timing CAFM is late for the target main injection ignition timing CAFMM. Thereafter, the ignition delay correction amount CADM gradually increases, and the main injection ignition timing CAFM gradually advances (increases). The cetane number learning value CETLRN gradually decreases corresponding to the increase in the ignition delay correction amount CADM. At time t1, the cetane number learning value becomes less than the predetermined threshold value CETH, that is, CETH−$\Delta h$.

Consequently, the determined cetane number parameter CETD changes from "2" to "1", and the target EGR amount GEGR is switched from the second target EGR amount map value GEGRM2 to the first target EGR amount map value GEGRM1. Therefore, recirculation of the exhaust gas is performed at the appropriate flow rate for the fuel in use. At the same time, the switching block 73 is switched from the output of the second conversion block 72 to the output of the first conversion block 71. Also, the conversion table for calculating the cetane number is switched from the CETB table to the CETA table corresponding to a change in the ignition delay angle DCAM due to the change in the amount of exhaust gases being recirculated. Accordingly, the cetane number is accurately estimated irrespective of the change in the actual ignition timing caused by the change in the recirculated amount of exhaust gases. Therefore, after time t1, the cetane number learning value CETLRN becomes substantially equal to the first cetane number CET1 and the state is maintained. The ignition delay correction amount CADM slightly increases after time t1 due to a delay of change in the actual amount of the exhaust gases recirculated. Thereafter, the ignition delay correction amount CADM gradually decreases as the recirculated amount of the exhaust gases decreases.

As described above, in this embodiment, the target main injection ignition timing CAFMM is calculated using the CAFMM map set according to the engine rotational speed NE and the demand torque TRQ. The ignition delay correction amount CADM is calculated so that the detected main injection ignition timing CAFM coincides with the target main injection ignition timing CAFMM. Also, the main injection timing map value CAIMM is corrected with the ignition delay correction amount CADM. Further, the target EGR amount GEGR is calculated using the GEGRM1 map or the GEGRM2 map set according to the engine rotational speed NE and the demand torque TRQ. The EGR valve 27 is controlled so that the recirculated amount of exhaust gases coincides with the calculated target EGR amount GEGR. Further, the cetane number learning value CETLRN of the fuel is calculated using the CETA table or the CETB table for converting the ignition delay correction amount CADM to the cetane number of the fuel. The determined cetane number parameter CETD is then set according to the cetane number learning value CETLRN. The first EGR amount map value GEGRM1 and the second EGR amount map value GEGRM2 are switched according to the determined cetane number parameter CETD. Also, the CETA table and the CETB table for estimating the cetane number are switched.

When the first EGR amount map value GEGRM1 and the second EGR amount map value GEGRM2 are switched according to the determined cetane number parameter CETD, the recirculated amount of exhaust gases changes as does the ignition delay correction amount CADM. Therefore, the cetane number of the fuel in use is accurately estimated by switching the conversion table for estimating the cetane number according to the determined cetane number parameter CETD. Consequently, the cetane number of the fuel in use is estimated with sufficient accuracy, while appropriately controlling the recirculation amount of the exhaust gases according to the detected actual ignition timing.

In this embodiment, the fuel injection valve 6 forms the fuel injection means, the crank angle position sensor 3 and the accelerator sensor 33 form the operating condition detecting means, and the ECU 4 forms the fuel injection control means, the target ignition timing storing means, the target ignition timing calculating means, a portion of the ignition timing detecting means, the exhaust gas recirculation control value storing means, the exhaust gas recirculation control means, the conversion table storing means, the cetane number estimating means, and the feedback control means. Specifically, the CAFMM map corresponds to the target ignition timing storing means, and the cylinder pressure sensor 2 and the ignition timing detection block 62 correspond to the ignition timing detecting means. The GEGRM1 map and the GEGRM2 map correspond to the exhaust gas recirculation control value storing means. The first target EGR amount map value calculation block 51, the second target EGR amount map value calculation block 52, and the switching block 53 correspond to a part of the exhaust gas recirculation control means. The CETA table and the CETB table correspond to the conversion table storing means. The subtracting block 63, the switching block 64, the filtering block 65, and the PI control block 66 correspond to the feedback control means. The first conversion block 71, the second conversion block 72, the switching block 73, the cetane number learning block 74, and the determination parameter setting block 75 correspond to the cetane number estimating means. The main injection timing map value calculation block 41 and the adding block 42 correspond to the fuel injection control means.

The present invention is not limited to the embodiment described above, and various modifications may be made. For example, in the above-described embodiment, two maps for the target EGR amount calculation (the GEGRM1 map, the GEGRM2 map) and two tables for the cetane number conversion (the CETA table, the CETB table) are provided corresponding to the fuels of two cetane numbers. Alternatively, three or four maps for the target EGR amount calculation and three or four tables for the cetane number conversion may be provided corresponding, respectively, to the fuels of three or four cetane numbers. In this case, the determined cetane number parameter CETD is set to three (1 to 3) or four values (1 to 4) according to a number of the cetane numbers to be determined, and the switching blocks 53 and 73 respectively select one output from three or four inputs.

Further, in the above-described embodiment, the cetane number is estimated based on the main injection ignition timing CAFM corresponding to the main injection. Alternatively, the cetane number estimation may be performed based on the pilot injection ignition timing CAFP corresponding to the pilot injection. Further, the pilot injection timing may be corrected according to the estimated cetane number.

Further, in the above-described embodiment, the cylinder pressures of all cylinders are detected to calculate the cetane number learning value CETLRN. Alternatively, only one cylinder pressure sensor may be disposed at a specific cylinder, and the cetane number learning value CETLRN may be calculated based on the cylinder pressure (pressure change rate) detected by the cylinder pressure sensor.

Further, the ignition delay time period TDFM changes depending not only on the cetane number of the fuel, but on deterioration of the fuel injection valve 6. Therefore, it is preferable to correct the ignition delay time period TDFM according to the mileage of the vehicle driven by the engine 1 or an integrated value of the operating time period of the engine 1.

In the above-mentioned embodiment, an example of the 4-cylinder diesel internal combustion engine is shown. The present invention can be applied to a diesel internal combustion engine having another number of cylinders, or a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all modifications which come within the meaning and range of equivalency of the claims are, therefore, to be embraced therein.

What is claimed is:

1. A control system for an internal combustion engine having fuel injection means provided in a combustion chamber of the engine for injecting fuel into the combustion chamber, and an exhaust gas recirculation mechanism for recirculating exhaust gases of the engine to an intake system of the engine, the control system comprising:
   operating condition detecting means for detecting an operating condition of the engine;
   fuel injection control means for determining a fuel injection timing according to the detected engine operating condition, and executing a fuel injection through the fuel injection means;
   target ignition timing storing means for storing target compression ignition timings of the fuel injected into the combustion chamber, the target compression ignition timings being set according to the operating condition of the engine;
   ignition timing detecting means for detecting an actual compression ignition timing of the fuel injected into the combustion chamber;

target ignition timing calculating means for calculating the target compression ignition timing using the target ignition timing storing means;

feedback control means for calculating an ignition delay correction amount so that the actual compression ignition timing coincides with the target compression ignition timing;

a plurality of exhaust gas recirculation control value storing means for storing control values of an amount of exhaust gases recirculated through the exhaust gas recirculation mechanism, the control values being set according to the operating condition of the engine;

exhaust gas recirculation control means for calculating the control value of the recirculated amount of exhaust gases using the plurality of exhaust gas recirculation control value storing means to control the recirculated amount of exhaust gases;

a plurality of conversion table storing means for storing a conversion table used for converting the ignition delay correction amount to a cetane number of the fuel; and cetane number estimating means for estimating the cetane number of the fuel using the plurality of conversion table storing means, wherein the fuel injection control means corrects the fuel injection timing with the ignition delay correction amount;

the exhaust gas recirculation control means switches the exhaust gas recirculation control value storing means to be used for calculating the control value of the recirculation amount of exhaust gases according to the estimated cetane number; and the cetane number estimating means switches the conversion table storing means to be used for estimating the cetane number according to the estimated cetane number.

2. The control system according to claim 1, wherein the plurality of the conversion tables stored in the plurality of conversion table storing means are set based on fuels of different cetane numbers.

3. The control system according to claim 1, wherein the cetane number estimating means performs an estimation process when the detected engine operating condition is in a premix combustion region.

4. A control method for an internal combustion engine having at least one fuel injection valve provided in a combustion chamber of the engine for injecting fuel into the combustion chamber, and an exhaust gas recirculation mechanism for recirculating exhaust gases of the engine to an intake system of the engine, the control method comprising the steps of:

a) detecting an operating condition of the engine;

b) determining a fuel injection timing according to the detected engine operating condition;

c) executing a fuel injection through the at least one fuel injection valve;

d) detecting an actual compression ignition timing of the fuel injected into the combustion chamber;

e) calculating a target compression ignition timing using a target ignition timing map which stores target compression ignition timings of the fuel injected into the combustion chamber, the target compression ignition timings being set according to the operating condition of the engine;

f) calculating an ignition delay correction amount so that an actual compression ignition timing coincides with the target compression ignition timing;

g) calculating a control value of an amount of recirculated exhaust gases using a plurality of exhaust gas recirculation control value maps to control the recirculation amount of exhaust gases, the plurality of exhaust gas recirculation control value maps storing the control values of the recirculation amount of exhaust gases through the exhaust gas recirculation mechanism, the control values being set according to the operating condition of the engine; and h) estimating a cetane number of the fuel using a plurality of conversion tables for converting the ignition delay correction amount to a cetane number of the fuel;

wherein the fuel injection timing is corrected with the ignition delay correction amount;

the exhaust gas recirculation control value map used for calculating the control value of the recirculation amount of exhaust gases is switched according to the estimated cetane number; and the conversion table used for estimating the cetane number is switched according to the estimated cetane number.

5. The control method according to claim 4 wherein the plurality of the conversion tables are set based on fuels of different cetane numbers.

6. The control method according to claim 4, wherein the estimation of the cetane number is performed when the detected engine operating condition is in a premix combustion region.

* * * * *